United States Patent
Arcese et al.

(10) Patent No.: US 10,635,482 B2
(45) Date of Patent: *Apr. 28, 2020

(54) CONTROLLING USAGE OF VIRTUAL DISKS BEFORE THEIR ATTACHMENT TO VIRTUAL MACHINES

(71) Applicant: INTERNATIONAL BUSINESS MACHINES CORPORATION, Armonk, NY (US)

(72) Inventors: Mauro Arcese, Rome (IT); Giuseppe Ciano, Rome (IT); Luigi Pichetti, Rome (IT)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,072

(22) Filed: Mar. 21, 2019

(65) Prior Publication Data

US 2019/0213035 A1 Jul. 11, 2019

Related U.S. Application Data

(63) Continuation of application No. 13/679,085, filed on Nov. 16, 2012, now Pat. No. 10,282,221.

(30) Foreign Application Priority Data

Dec. 9, 2011 (EP) .................................. 11192712

(51) Int. Cl.
*G06F 9/455* (2018.01)
*G06F 21/45* (2013.01)
(Continued)

(52) U.S. Cl.
CPC .......... *G06F 9/45558* (2013.01); *G06F 21/45* (2013.01); *G06F 21/53* (2013.01);
(Continued)

(58) Field of Classification Search
CPC ..... G06F 9/455; G06F 2009/455; G06F 21/44
See application file for complete search history.

(56) References Cited

U.S. PATENT DOCUMENTS 6,282,710 B1 8/2001 Boehler
6,405,362 B1 6/2002 Shih et al.
(Continued)

OTHER PUBLICATIONS

Feigel et al., Protection of Licensed Software Applications in a Network Environment, Feb. 1, 1988, IBM Technical Disclosure Bulletin, vol. #30, pp. 37-38.
(Continued)

*Primary Examiner* — Emerson C Puente
*Assistant Examiner* — Zhi Chen
(74) *Attorney, Agent, or Firm* — Christopher Pignato; Andrew M. Calderon; Roberts Mlotkowski Safran Cole & Calderon, P.C.

(57) ABSTRACT

Controlling usage of virtual disks in a data-processing center hosting a set of virtual machines is described where each virtual disk comprises a set of software artifacts. A corresponding method comprises detecting a request of adding a new virtual disk comprising a set of new software artifacts to a selected one of the virtual machines, determining composition information of the new virtual disk, which includes an indication of the new software artifacts, retrieving an indication of usage entitlements of the new software artifacts in the data-processing center, enabling or preventing the attachment of the new virtual disk to the selected virtual machine according to a comparison between the composition information and the usage entitlements, attaching the new virtual disk to the selected virtual machine in response to the enabling thereof, and updating the usage entitlements in response to the attachment of the new virtual disk.

17 Claims, 7 Drawing Sheets

(51) Int. Cl.
*G06F 21/53* (2013.01)
*G06F 21/62* (2013.01)
*G06F 21/78* (2013.01)

(52) U.S. Cl.
CPC .......... *G06F 21/6218* (2013.01); *G06F 21/78* (2013.01); *G06F 2009/45595* (2013.01); *G06F 2221/2143* (2013.01); *G06F 2221/2149* (2013.01)

(56) References Cited

U.S. PATENT DOCUMENTS

| | | | |
|---|---|---|---|
| 6,820,099 | B1 | 11/2004 | Huber et al. |
| 7,043,725 | B1 | 5/2006 | Krishnan et al. |
| 7,231,668 | B2 | 6/2007 | Jacobson |
| 8,452,921 | B1 * | 5/2013 | Li .................. G06F 9/4555 711/112 |
| 2002/0112222 | A1 | 8/2002 | Fischer et al. |
| 2003/0005427 | A1 | 1/2003 | Herrero |
| 2003/0191838 | A1 | 10/2003 | Tsao |
| 2004/0010440 | A1 | 1/2004 | Lenard et al. |
| 2005/0132353 | A1 | 6/2005 | Chen |
| 2006/0155667 | A1 | 7/2006 | Tolba |
| 2006/0218544 | A1 | 9/2006 | Chakraborty et al. |
| 2007/0018450 | A1 | 1/2007 | Golafshani |
| 2007/0033652 | A1 | 2/2007 | Sherwani et al. |
| 2007/0180450 | A1 | 8/2007 | Croft et al. |
| 2007/0198427 | A1 | 8/2007 | Vajjiravel et al. |
| 2007/0276897 | A1 | 11/2007 | Tameshige et al. |
| 2007/0277029 | A1 | 11/2007 | Rao et al. |
| 2008/0098391 | A1 | 4/2008 | Medvedev et al. |
| 2009/0119779 | A1 | 5/2009 | Dean et al. |
| 2009/0241104 | A1 | 9/2009 | Amiga et al. |
| 2009/0287799 | A1 | 11/2009 | Tameshige et al. |
| 2009/0328225 | A1 | 12/2009 | Chambers et al. |
| 2010/0050173 | A1 | 2/2010 | Hensbergen |
| 2010/0100565 | A1 | 4/2010 | Adachi |
| 2011/0047624 | A1 | 2/2011 | Vedantam et al. |
| 2011/0072424 | A1 | 3/2011 | Choi et al. |
| 2011/0173608 | A1 * | 7/2011 | Buragohain ........ G06F 9/45558 718/1 |
| 2011/0179268 | A1 | 7/2011 | Strom et al. |
| 2011/0185292 | A1 * | 7/2011 | Chawla .................. G06F 9/452 715/760 |
| 2011/0276806 | A1 | 11/2011 | Casper et al. |
| 2012/0047568 | A1 | 2/2012 | Keng |
| 2012/0174096 | A1 | 7/2012 | Conover |
| 2012/0209897 | A1 | 8/2012 | Li et al. |
| 2013/0276068 | A1 | 10/2013 | Alwar |

OTHER PUBLICATIONS

Great Britain Intellectual Property Office, "Search Report under Section 17," issued in Great Britain patent application No. GB1221333.6, dated May 29, 2013.

* cited by examiner

CONTROLLING USAGE OF VIRTUAL DISKS BEFORE THEIR ATTACHMENT TO VIRTUAL MACHINES

CROSS-REFERENCE TO RELATED APPLICATIONS

The present Application for Patent claims priority to European Patent Application No. 11192712.5, entitled "CONTROLLING USAGE OF VIRTUAL DISKS BEFORE THEIR ATTACHMENT TO VIRTUAL MACHINES" and filed Dec. 9, 2011, which is expressly incorporated by reference herein.

TECHNICAL FIELD

The solution according to one or more embodiments of the present invention relates to the data-processing field. More specifically, this solution relates to the control of the usage of virtual disks.

BACKGROUND

Virtualization techniques are commonplace in modern data-processing centers; a typical example is the implementation of virtual machines (i.e., emulations by software of physical machines). The virtual machines may be used in a number of applications—for example, for deploying virtual appliances. A virtual appliance is a software solution comprising one or more virtual machines, each one with one or more application programs (for performing specific user tasks) and a Just Enough Operating System, or JeOS (i.e., a limited operating system specifically tailored to support the application programs). The virtual appliance is encapsulated in a pre-built, self-contained package, which is managed as a unit; this provides a simplified management (i.e., development, deployment and maintenance), and allows provisioning corresponding turnkey software services in a very fast way.

As a further advantage, each virtual machine may be organized into multiple virtual disks (each one emulating a physical disk). Each virtual disk may be deployed as a corresponding virtual disk image (i.e., a physical file that defines the whole virtual disk).

For example, in this way it is possible to separate the operating system from the application programs of the virtual machine. This simplifies the maintenance of the application programs; indeed, it is now possible to download a new virtual disk with an updated version of the application programs, turn offline the virtual machine, replace the virtual disk of the application programs, and then turn online the virtual machine again. Moreover, this allows changing the operating system of the virtual machine by simply replacing its virtual disk. In addition or in alternative, it is also possible to separate the application programs into different virtual disks for their execution components (i.e., binary files) and data components (i.e., configuration and/or information files); this allows updating the execution components of the application programs without losing its data components by simply replacing the corresponding virtual disks.

A problem of the virtual machines organized into multiple virtual disks is the difficulty of controlling the usage of their application programs (or any other software artifacts) to ensure compliance with license entitlements (or any other usage entitlements) applicable in the data-processing center. This problem is particularly acute in large virtual appliances—for example, conforming to the Service Oriented Architecture, or SOA (providing a suite of loosely coupled services). Indeed, in this case each virtual appliance may comprise multiple application tiers, each one of them in turn comprising multiple virtual machines (for example, a typical web application with a web tier implementing a presentation logic, an application server tier implementing a business logic, and a back-end database tier implementing a data management logic).

In order to control the usage of the application programs comprised in the different virtual disks, it is possible to use a standard licensing tool that interacts with each virtual machine and possibly with an underlying hardware hosting them. For example, US-A-2007/0180450 and US-A-2009/0328225 (the entire disclosures of which are herein incorporated by reference) describe techniques for verifying whether a given software application may be started in a virtual machine according to the available license entitlements. Moreover, US-A-2011/0047624 (the entire disclosure of which is herein incorporated by reference) describes the use of a binding agent that communicates with a license enforcement module comprised in each virtual machine; the binding agent binds the license enforcement modules in mutual exclusion to the underlying hardware (for example, uniquely defined by its Media Access Control (MAC) address) so as to ensure that a single license enforcement module is allowed to run on this hardware at any time.

However, the above-mentioned techniques require the modification of the virtual machines (for example, to inject corresponding licensing agents).

In any case, this requires that any new virtual disk should be attached to a corresponding virtual machine before verifying the compliance of its application programs with the available license entitlements (so that corresponding actions—for example, preventing their execution—may be taken).

BRIEF SUMMARY

In its general terms, the solution according to one or more embodiments of the present invention is based in the idea of controlling each virtual disk before attaching it to the corresponding virtual machine.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for controlling usage of virtual disks in a data-processing center hosting a set of virtual machines, each virtual disk comprising a set of software artifacts. The method includes detecting a request of adding a new virtual disk comprising a set of new software artifacts to a selected one of the virtual machines. The method also includes determining composition information of the new virtual disk, the composition information of the new virtual disk comprising an indication of the set of new software artifacts. The method further includes retrieving an indication of usage entitlements of the new software artifacts in the data-processing center. Moreover, the method includes enabling or preventing the attachment of the new virtual disk to the selected virtual machine according to a comparison between the composition information of the new virtual disk and the usage entitlements of the new software artifacts. The method also includes attaching the new virtual disk to the selected virtual machine in response to the enabling thereof. In addition, the method includes updating the usage entitlements of the new software artifacts in response to the attachment of the new virtual disk to the selected virtual machine.

A further aspect of the solution according to an embodiment of the invention provides a corresponding computer program.

A different aspect of the solution according to an embodiment of the invention provides a corresponding data-processing system.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

As will be appreciated by one skilled in the art, aspects of the present invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium having computer usable program code embodied in the medium.

Any combination of one or more computer readable medium may be utilized. The computer readable medium may be computer-readable signal medium or computer-readable storage medium. The computer-readable storage medium may be, for example but not limited to, an electronic, magnetic, optical, electromagnetic, infrared, or semiconductor system, apparatus, device or any combinations thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any proper combinations thereof. In the context of this document, a computer-readable storage medium may be any tangible medium that can contain, or store the program for use by or in connection with the instruction execution system, apparatus, or device.

Computer readable signal medium may include a propagated data signal with the computer-readable program code embodied therewith, either in baseband or as part of a carrier wave. Such propagated signal may use any proper form, including but not limited to, electromagnetic signal, optical signal, or any proper combination thereof. Computer readable signal medium may be any computer readable medium that is different from computer-readable storage medium and can communicate, propagate, or transport the program for use by or in connection with the instruction execution system, apparatus, or device.

Program code included in the computer readable medium may be transmitted using any appropriate medium, including but not limited to wireless, wired, optical fiber cable, RF, etc. or any proper combination thereof.

Computer program code for carrying out operations of the present invention may be written in any combination of one or more programming languages, including an object oriented programming language such as Java, Smalltalk, C++ or the like and conventional procedural programming languages, such as "C" programming language or similar programming languages. The program code may execute entirely on a user computer, partly on a user computer, as a stand-alone software package, partly on user computer and partly on a remote computer or entirely on a remote computer or server. In the latter scheme, the remote computer may be connected to the user computer through any type of network, including a local area network (LAN) or a wide area network (WAN), or the connection may be made to an external computer (for example, through the Internet using an Internet Service Provider).

Below, aspects of the invention will be described with reference to flowchart and/or block diagram of methods, apparatuses (systems) and computer program products of the embodiment of the invention. Note that, each block of the flowchart and/or block diagram, and combinations of blocks in the flowchart and/or block diagram, can be implemented by computer program instructions. These computer program instructions may be provided to a processor of a general-purpose computer, a special-purpose computer or other programmable data processing apparatus to produce a machine, such that the instructions which execute on the computer or other programmable data processing apparatus create means for implementing the functions/actions specified in the block(s) of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the functions/actions specified in the block(s) of the flowchart and/or block diagram.

The computer program instructions may also be loaded into a computer or other programmable data processing apparatus to perform a series of operational steps on the computer or other programmable data processing apparatus so as to produce computer implemented process, such that the instructions which execute on the computer or other programmable data processing apparatus will provide process for implementing the functions/actions specified in the block(s) of the flowchart and/or block diagram.

Figure 1:
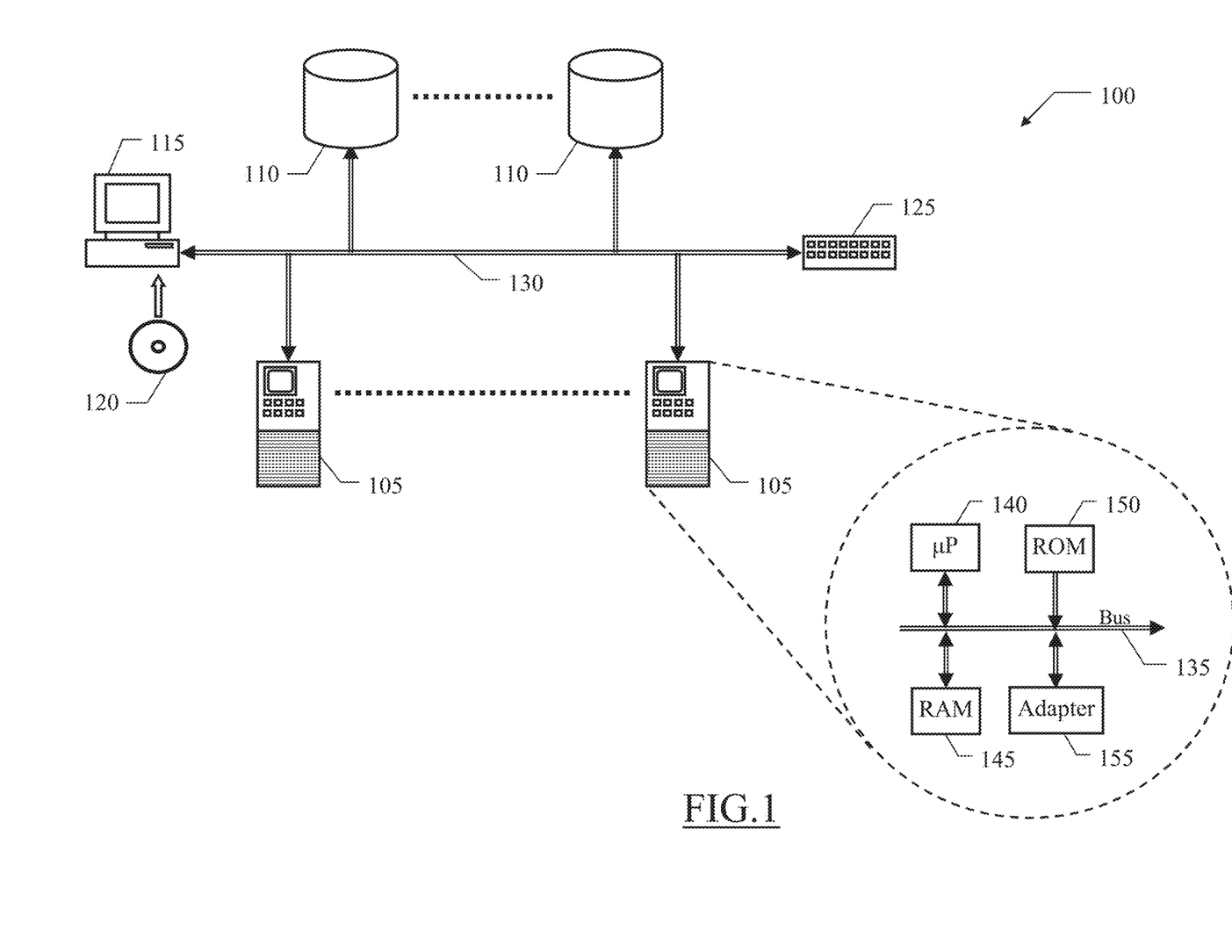
FIG. 1 shows a pictorial representation of a data-processing center that may be used to practice the solution according to an embodiment of the invention.

With reference in particular to the FIG. 1, a pictorial representation is shown of a data-processing center 100 that may be used to practice the solution according to an embodiment of the invention.

The data-processing center 100 comprises a set of processing systems 105 (for example, server computers), a set of storage systems 110 (for example, hard-disks), and a console 115 for controlling them—which console 115 may also be provided with a drive for reading Digital Video Discs (DVDs) or Compact Discs (CDs) 120. A router (or switch) system 125 manages communications among the processing systems 105, the storage systems 110 and the console 115, and with the outside of the data-processing center 100 (for example, through the Internet); for these purposes, the processing systems 105, the storage systems 110, the console 115 and the router system 125 are connected through a cabling system 130.

Each processing system 105 is formed by several units that are connected in parallel to a communication bus 135. In detail, a set of (one or more) microprocessors (μP) 140 controls operation of the processing system 105; a Random Access Memory (RAM) 145 is directly used as a working memory by the microprocessors 140, and a Read-Only Memory (ROM) 150 stores basic code for a bootstrap of the processing system 105. Moreover, the processing system 105 comprises a network adapter 155, which is used to connect the processing system 105 to the cabling system 130.

Figure 2:
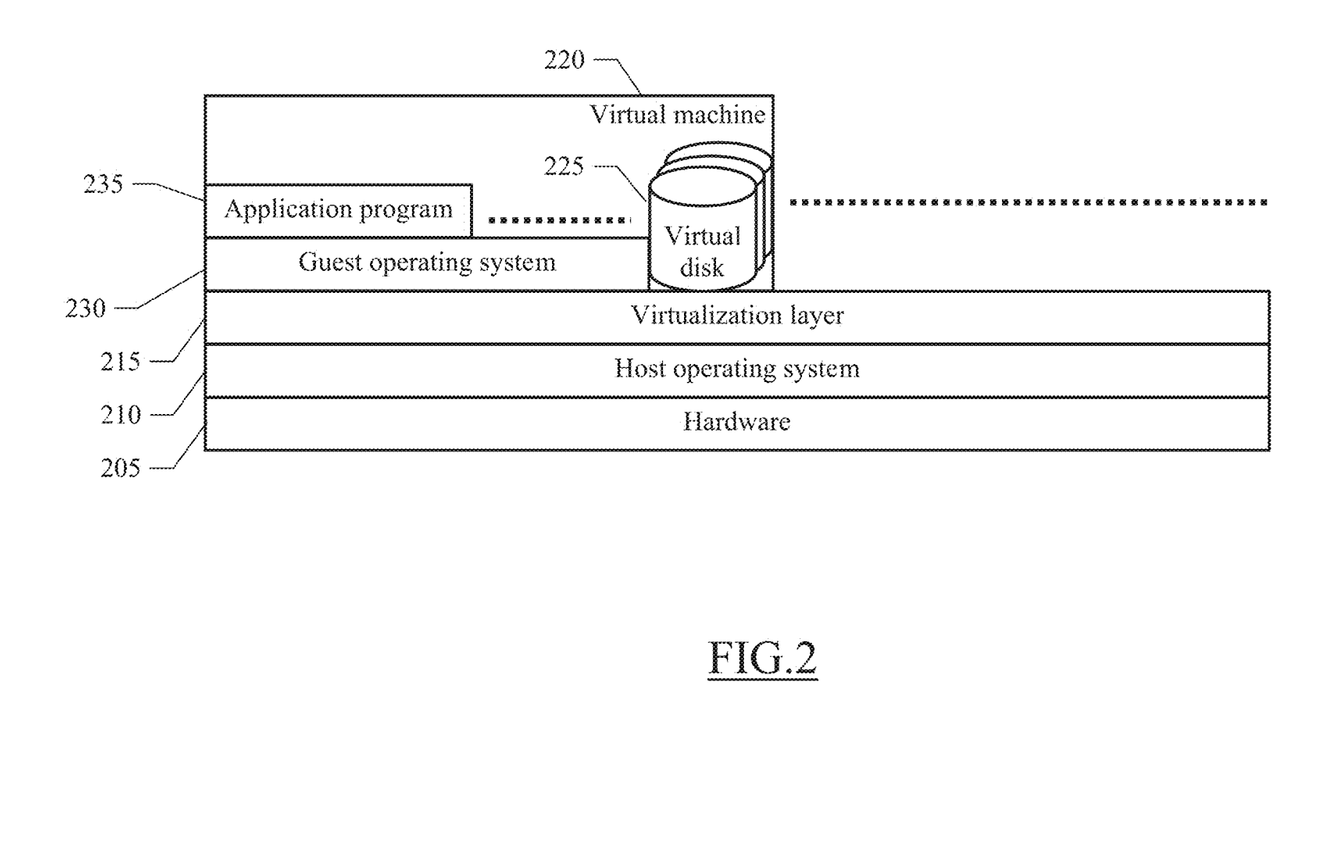
FIG. 2 shows a block diagram of an exemplary virtualized environment wherein the solution according to an embodiment of the invention may be applied.

A block diagram of an exemplary virtualized environment wherein the solution according to an embodiment of the invention may be applied is shown in the FIG. 2.

The virtualized environment is implemented on a hardware 205 defined by one or more processing systems and one or more storage systems of the above-described data-processing center. For this purpose, a host operating system 210 running directly on the hardware 205 defines a software platform on top of which any other program may run. In this specific case, a virtualization layer 215 running on top of the host operating system 210 emulates one ore more virtual machines 220; examples of commercial virtualization layers available on the market are VMware by VMware Inc. and Xen by Citrix Systems, Inc. (trademarks of the corresponding owners). Each virtual machine 220 is an abstract structure that emulates a physical machine, which the virtual machine has sole control of. Particularly, each virtual machine 220 comprises one or more virtual disks 225 (each one emulating a physical disk); each virtual disk 225 is actually stored in the hardware 205 by means of a corresponding virtual disk image (not shown in the figure), which consists of a file with a predefined format (for example, the Virtual Machine Disk (VMDK) format used by VMware, or the Virtual Hard Disk (VHD) format used by Xen). In each virtual machine 220, a guest operating system 230 now runs on its emulated hardware. The guest operating system 230 likewise defines a software platform of the virtual machine 220, on top of which one or more application programs 235 run.

An exemplary application of the solution according to an embodiment of the invention is shown in the FIG. 3A-FIG. 3G. This solution controls the usage of generic software artifacts (for example, the application programs) in the above-described data-processing center.

Figure 3A:
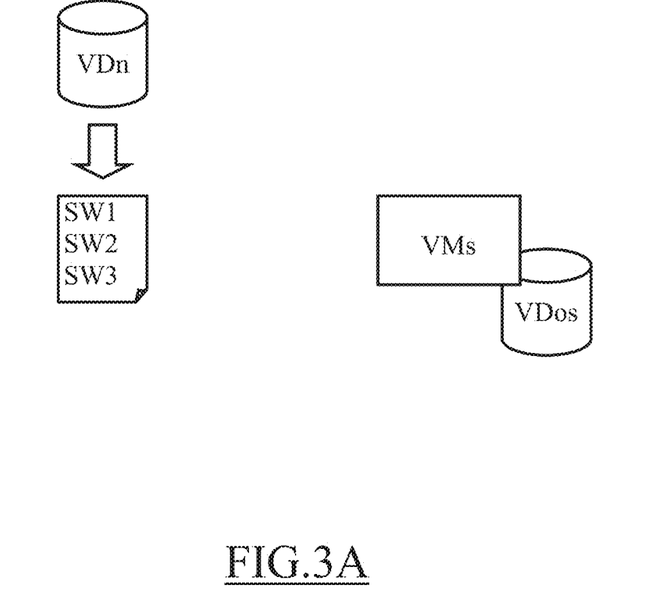
FIG. 3A-FIG. 3G show an exemplary application of the solution according to an embodiment of the invention.

Starting from the FIG. 3A, a request is detected for attaching a new virtual disk VDn to a selected virtual machine VMs already hosted on the data-processing center—with a (system) virtual disk VDos comprising its guest operating system attached thereto. In response thereto, a list is determined of new software programs that are comprised in the new virtual disk VDn (for example, from a corresponding descriptor); in this specific case the new virtual disk VDn comprises three new application programs SW1, SW2 and SW3.

Figure 3B:
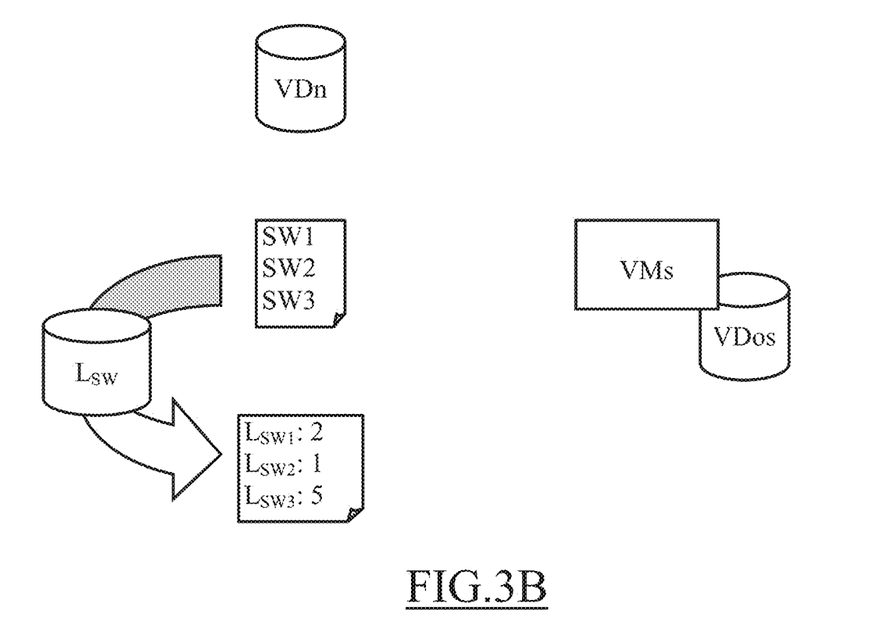

Passing to the FIG. 3B, license (or any other usage) entitlements that are available in the data-processing center for the new application programs SW1-SW3 are retrieved (for example, from a repository storing all the license entitlements available in the data-processing center, denoted as a whole with $L_{sw}$); for example, in this case the license entitlements indicate that the further usage of 2 instances of the application program SW1 ($L_{sw1}$: 2), 1 instance of the application program SW2 ($L_{sw2}$: 1) and 5 instances of the application program SW3 ($L_{sw3}$: 5) are allowed.

Figure 3C:
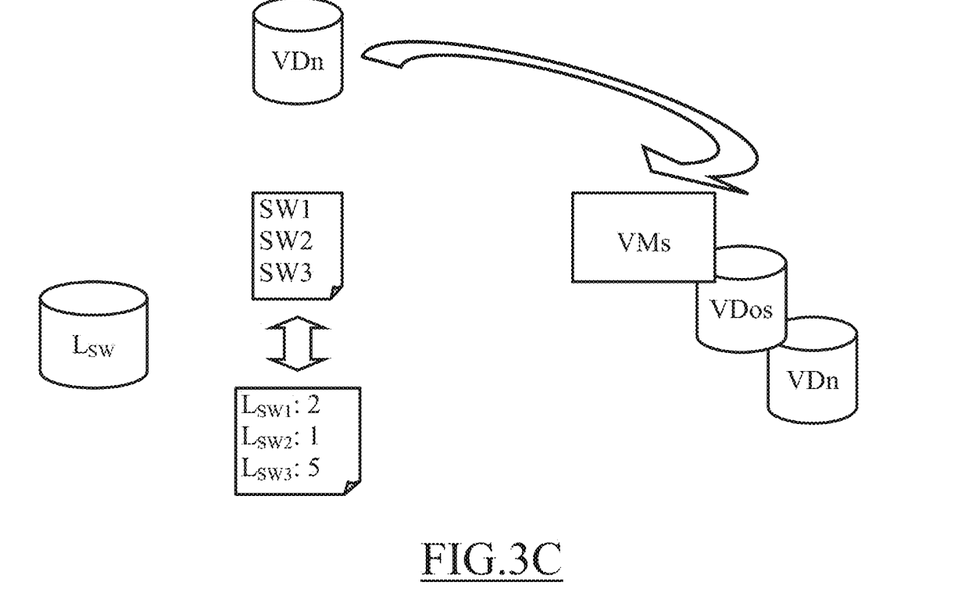

With reference to the FIG. 3C, the new application programs SW1-SW3 are compared with the license entitlements $L_{sw1}$-$L_{sw3}$, in order to enable or prevent the attachment of the new virtual disk VDn to the selected virtual machine VMs according to the result of the comparison. In this case, the license entitlements $L_{sw1}$-$L_{sw3}$ allow the further usage of an instance of each one of the new application programs SW1-SW3. Therefore, the new virtual disk VDn is attached to the selected virtual machine VMs.

Figure 3D:
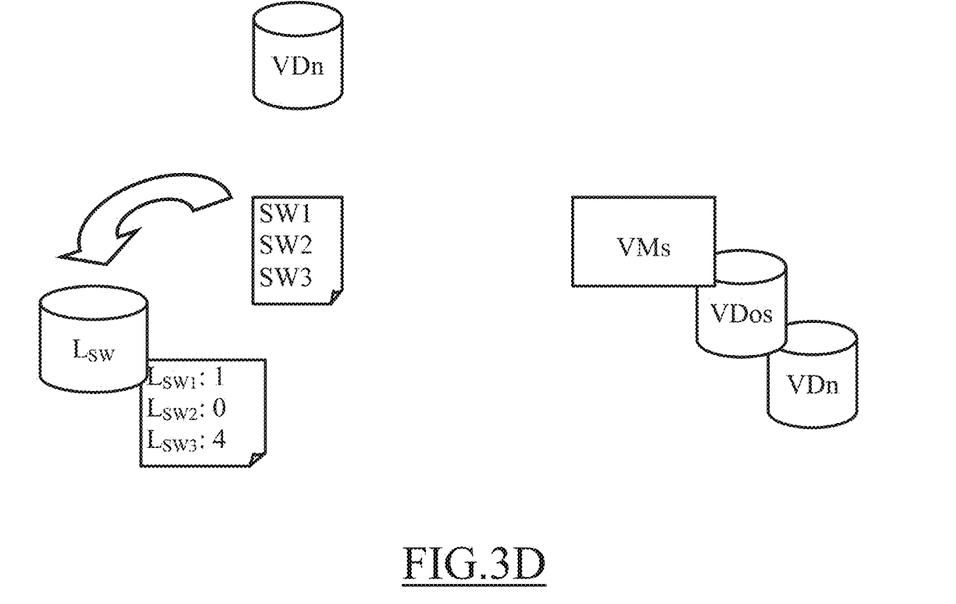

Considering the FIG. 3D, the license entitlements $L_{sw1}$-$L_{sw3}$ are updated accordingly (in the corresponding repository); in this case, the number of instances of each new application program SW1-SW3 that may be further used is reduced by one (i.e., $L_{sw1}$: 1, $L_{sw2}$: 0 and $L_{sw3}$: 4).

Figure 3E:
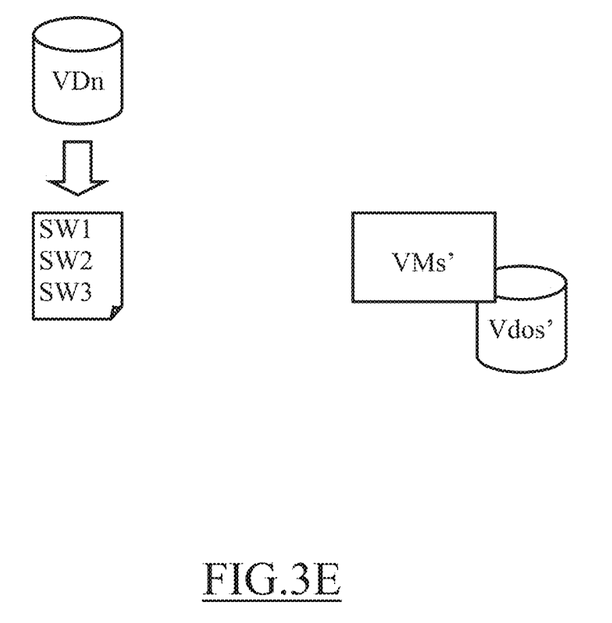

As shown in the FIG. 3E, later on a request is detected for attaching the same new virtual disk VDn to another selected virtual machine VMs' (already hosted on the data-processing center, with a system virtual disk VDos' comprising its guest operating system attached thereto). In response thereto, the same list is determined of the new application programs SW1, SW2 and SW3 comprised in the new virtual disk VDn (for example, from a corresponding library wherein it has been previously saved).

Figure 3F:
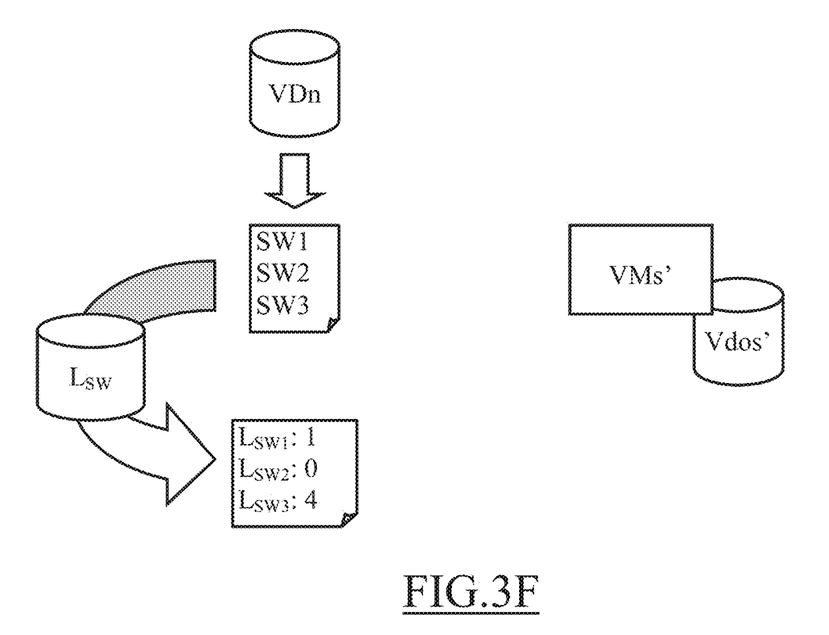

Passing to the FIG. 3F, the license entitlements for the new application programs SW1-SW3 are retrieved again; the license entitlements now indicate that the further usage of 1 instance of the application program SW1 ($L_{sw1}$: 1) and 4 instances of the application program SW3 ($L_{sw3}$: 4) are allowed, but that no further usage of the application program SW2 ($L_{sw2}$: 0) is allowed.

Figure 3G:
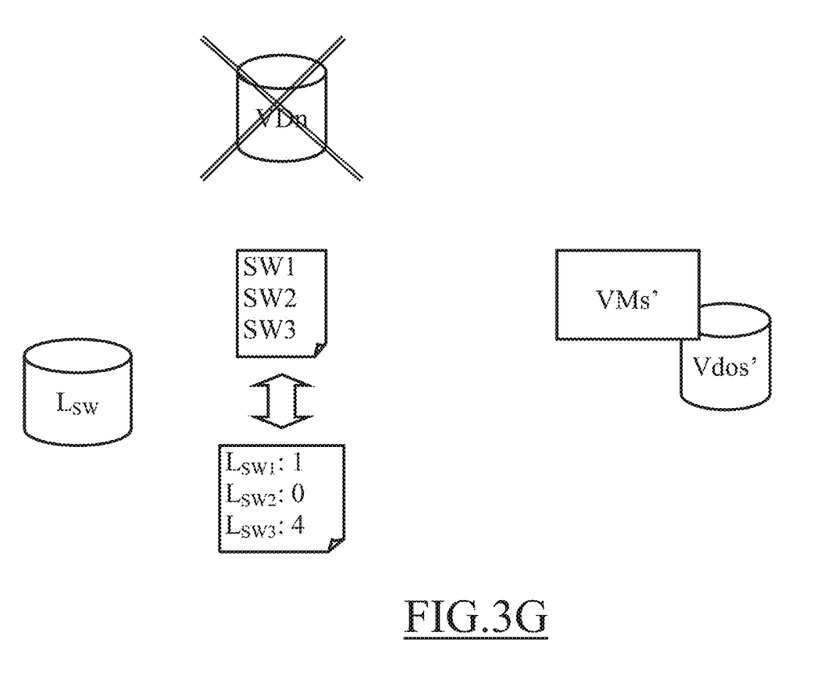

With reference to the FIG. 3G, as above the new application programs SW1-SW3 are compared with the license entitlements $L_{sw1}$-$L_{sw3}$. In this case, however, the license entitlements $L_{sw1}$-$L_{sw3}$ do not allow the further usage of an instance of all the new application programs SW1-SW3 (since this is not possible for the new application program SW2). Therefore, the new virtual disk VDn is not attached to the selected virtual machine VMs (or any other suitable action is taken).

The above-described solution according to an embodiment of the invention allows controlling the usage of the virtual disks in a very simple and effective way (especially in large virtual appliances—for example, conforming to the SOA); particularly, this result may be achieved automatically (with no, or in any case very few, manual interventions).

Moreover, the implementation of this solution does not require any modification of the virtual machines (so that it is completely opaque to their operation).

It is emphasized that the desired result is achieved without the need of attaching the new virtual disk to the selected virtual machine; therefore, any desired action may be taken proactively (according to the outcome of the above-described control).

Figure 4:
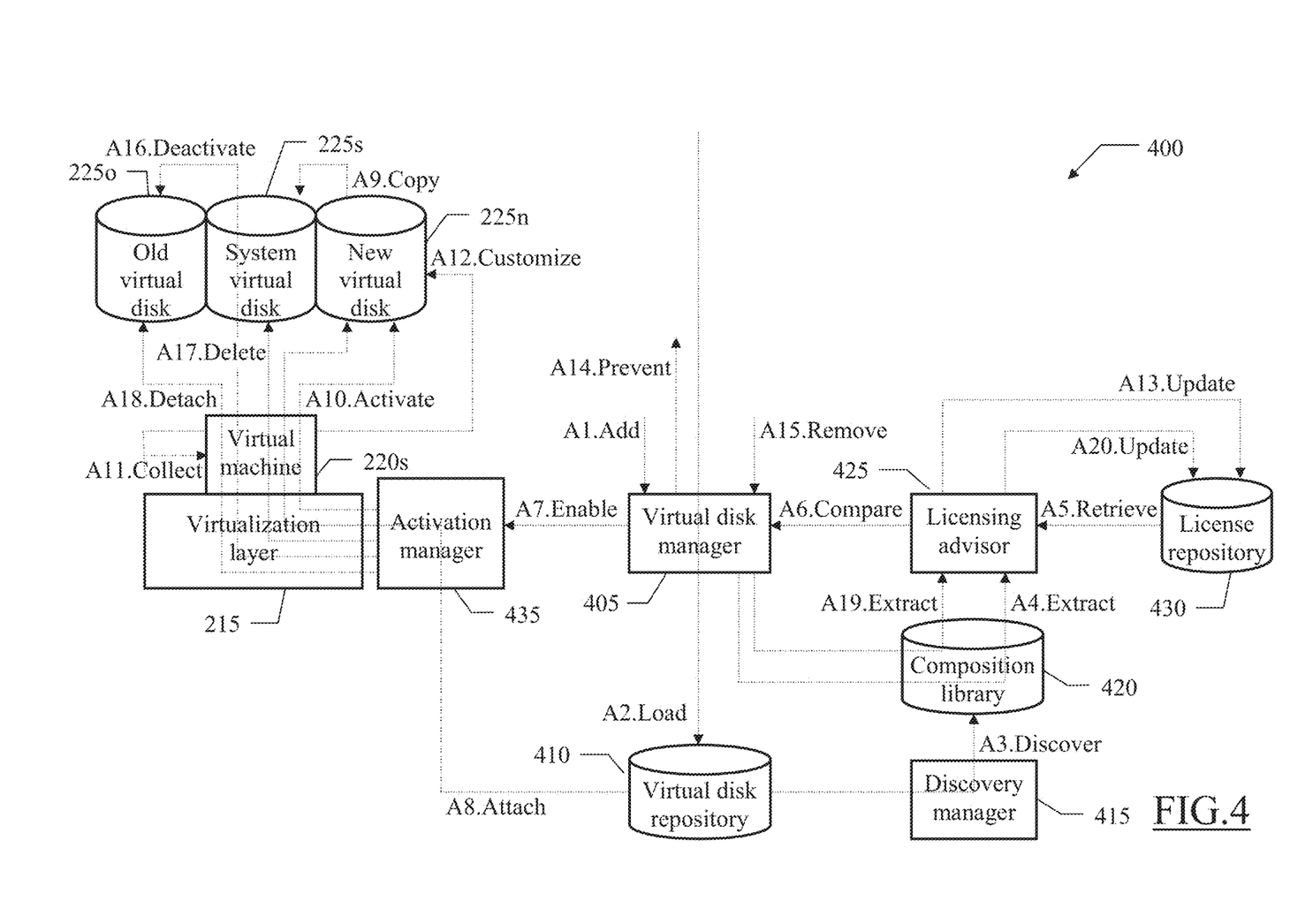
FIG. 4 shows a collaboration diagram representing the roles of the main software modules that may be used to implement the solution according to an embodiment of the invention.

With reference now to the FIG. 4, a collaboration diagram is shown representing the roles of the main software modules that may be used to implement the solution according to an embodiment of the invention. These software modules are denoted as a whole with the reference 400. The information (programs and data) is typically stored in the storage systems of the above-described data-processing center and loaded (at least partially) into the working memory of a specific processing system thereof when the programs are running. The programs are initially installed onto the storage systems, for example, from DVDs (through the console of the data-processing center). Particularly, the figure describes both the static structure of the software modules and their dynamic behavior (by means of a series of exchanged messages, each one representing a corresponding action, denoted with sequence numbers preceded by the symbol "A").

Particularly, a virtual disk manager 405 controls the usage of all the virtual disks in the data-processing center. For this purpose, the virtual disk manager 405 receives any request of adding a new virtual disk to a selected virtual machine (denoted with the reference 220s); the selected virtual machine 220s is already hosted on the virtualization layer 215, and it has at least the system virtual disk for its guest operating system (denoted with the reference 225s) attached thereto. The request is typically submitted to the virtual disk manager 405 manually by a system administrator for example, through a corresponding web interface (action "A1.Add").

The virtual disk manager 405 controls a virtual disk repository 410 that stores the images of all the virtual disks that may be used in the data-processing center. If the image of the new virtual disk is not available in the virtual disk repository 410, it is loaded therein—for example, from a web site of a corresponding vendor (action "A2.Load"). A discovering manager 415 discovers the new application programs comprised in the new virtual disk from its image (in the virtual disk repository 410); for example, when the new virtual disk conforms to the Open Virtualization Format (OVF) specification, the new application programs comprised therein are extracted from its OVF descriptor (in the ProductSection element of the VirtualSection element, between the tags <Product> and </Product> and between the tags <FullVersion> and </FullVersion>); alternatively, the image of the new virtual disk is scanned by leveraging an Application Program Interface (API) provided by its vendor (for example, the Virtual Disk Development Kit (VDDK) of VMware). The composition information of the new virtual disk so obtained is added to a composition library 420. For example, the composition library 420 comprises a record for each known virtual disk (already loaded in the virtual disk repository 410); the record comprises a unique identifier of the known virtual disk that is extracted from its image, and a unique identifier of each one of its application programs (defining its vendor, name, version and release). In this way, the composition information of all the virtual disks that may be used in the data-processing center is directly available in the composition library 420, so as to avoid repeating the above-described operations that may be very time and resource consuming (action "A3.Discover").

In any case, the virtual disk manager 405 passes the request of adding the new virtual disk to a licensing advisor 425. In response thereto, the licensing advisor 425 extracts the composition information of the new virtual disk from the composition library 420, wherein it is always present in view of the above (action "A4.Extract"). For each new application program of the new virtual disk so determined, the licensing advisor 425 retrieves the corresponding license entitlement from a license repository 430 (storing the license entitlements of all the software programs that may be used in the data-processing center—typically populated by a procurement administrator manually); for example, the license repository 430 comprises a record for each software program (i.e., operating system or application program), identified by its vendor, name, version and release, with a maximum number of instances of the software program that may be used in the data-processing center and a current number thereof (action "A5.Retrieve"). The licensing advisor 425 now compares the composition information of the new virtual disk with the license entitlements of its new application programs, in order to enable or prevent the attachment of the new virtual disk to the selected virtual machine 220s according to the result of this comparison (action "A6.Compare").

If the result of this comparison indicates that the further usage of all the new software programs on the selected virtual machine is possible (for example, because the difference between their maximum number and the current number is higher than zero), the virtual disk manager 405 accordingly instructs an activation manager 435; the activation manager 435 communicates with the virtualization layer 415 by leveraging its API (for example, the VIX interface of the VMware), in order to be able to automate different operations on the selected virtual machine 220s and its guest operating system (action "A7.Enable"). In response thereto, the activation manager 435 attaches the image of the new virtual disk in the repository 410 to the selected virtual machine 220s—wherein it is denoted with the reference 225n (action "A8.Attach"). Advantageously, the new virtual disk 225n is of the self-activating type. In this case, the new virtual disk 225n comprises a de-activation module for its automatic de-activation (as described in the following), which is copied by the activation manager 435 from the new virtual disk 225n to the system disk 225s (action "A9.Copy"). The activation manager 435 than automatically activates the new application programs that are comprised in the new virtual disk 225n; for example, the new virtual disk 225n may comprise a software package for the new application programs (with the corresponding files and instructions for activating them), which is applied onto the selected virtual machine 220s under the control of an installation engine (not shown in the figure) of the activation manager 435 (action "A10.Activate"). As a further improvement, the activation manager 435 may also execute a customization script that is comprised in the new virtual disk 225n. The customization script collects configuration information of the selected virtual machine 220s—for example, its Internet Protocol (IP) address (action "A11.Collect"). This configuration information is used to customize some of the new application programs accordingly—for example, by updating the IP address of communication sockets that are embedded in their private data (action "A12.Customize"). Once the new virtual disk 225n has been successfully attached to the selected virtual machine 220s (and activated/customized), the licensing advisor 425 accordingly updates the license entitlements of the new application programs (just added to the selected virtual machine 220s) in the license repository 430—for example, by increasing their current number (action "A13.Update").

Conversely, if the result of the comparison between the composition information of the new virtual disk and the license entitlements of its new application programs indicates that the further usage of all the new application programs on the selected virtual machine is not possible (for example, because the difference between the maximum number and the current number of one or more of them is zero), the virtual disk manager 405 prevents the attachment of the new virtual disk to the selected virtual machine 220s. In this case, a warning message (comprising an indication of the license entitlements that cannot be fulfilled) is returned to the system administrator (action "14.Prevent").

The virtual disk manager 405 also receives any request of removing an old virtual disk (denoted with the reference 225o) from a further selected virtual machine, the same as above (220s) for the sake of simplicity. In this case as well, the request is submitted to the virtual disk manager 405 manually by the system administrator (action "A15.Remove"). The virtual disk manager 405 accordingly instructs the activation manager 435, which at first de-activates the old application programs comprised in the old virtual disk 225o by executing the corresponding de-activation module that was previously copied on the system virtual disk 225s (action "A16.De-activate"). The activation manager 435 then deletes the de-activation module of the old virtual disk 225o from the system virtual disk 225s (action "A17.Delete"). At this point, the activation manager 435 may detach the old virtual disk 225o from the selected virtual machine 220s (action "A18.Detach"). Once the old virtual disk 225o has been successfully detached from the selected virtual machine 220s (and de-activated), the virtual disk manager 405 notifies the licensing advisor 425. In response thereto, the licensing advisor 425 extracts the composition information of the old virtual disk 225o from the composition library 420 (action "A19.Extract"). The licensing advisor 425 then accordingly updates the license entitlements of the old application programs (just removed from the selected virtual machine 220s) in the license repository 430—for example, by decreasing their current number (action "A20.Update").

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, the terms include, comprise, have and contain (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the invention provides a method for controlling usage of virtual disks in a data-processing center (of any type, see below) hosting a set of (one or more) virtual machines; the virtual machines may be implemented in any other way (for example, under the control of a hypervisor directly running on the hardware without any host operating system). Each virtual disk comprises a set of (one or more) software artifacts; the software artifacts may be of any type (for example, application programs, operating systems, databases, multi-media contents, and so on) and may be provided in any format (completely new software artifacts or new versions/releases thereof, in full format or in upgrade format, and so on).

The method comprises the following steps. A request of adding a new virtual disk comprising a set of (one or more) new software artifacts to a selected one of the virtual machines is detected (in any way—for example, with hooking techniques). Composition information of the new virtual disk is determined (in any way, see below); the composition information of the new virtual disk comprises an indication of the new software artifacts (in any format, for example, based on corresponding signatures). An indication of usage entitlements of the new software artifacts in the data-processing center is retrieved; the usage entitlements may be of any type (for example, simply defining usage authorizations based on internal policies) or defined in any way (for example, according to the residual number of instances of the software artifacts that may be further used, or based on the physical/virtual resources that are allocated to the software artifacts). The attachment of the new virtual disk to the selected virtual machine is enabled or prevented according to a comparison between the composition information of the new virtual disk and the usage entitlements of the new software artifacts (in any way, see below). The new virtual disk is attached to the selected virtual machine in response to the enabling thereof. The usage entitlements of the new software artifacts are then updated in response to the attachment of the new virtual disk to the selected virtual machine (in any way, for example, by decreasing their residual number, or by updating the amount of resources allocated thereto).

However, the same solution may be implemented with an equivalent method (by using similar steps with the same functions of more steps or portions thereof, removing some steps being non-essential, or adding further optional steps); moreover, the steps may be performed in a different order, concurrently or in an interleaved way (at least in part).

In an embodiment of the invention, the method further comprises the following steps. A request of removing an old virtual disk comprising a set of (one or more) old software artifacts from a further selected one of the virtual machines is detected (in any way, as above). The old virtual disk is detached from the further selected virtual machine. Composition information of the old virtual disk is determined (in any way, see below); the composition information of the old virtual disk comprises an indication of the old software artifacts (in any format, as above). Usage entitlements of the old software artifacts are updated in response to the detachment of the old virtual disk from the further selected virtual machine (in any way, as above).

However, a very basic implementation that controls the addition of new virtual disks only is contemplated.

In an embodiment of the invention, the step of determining composition information of the new virtual disk comprises retrieving the composition information of the new virtual disk from a composition library in response to the presence thereof, or discovering the composition information of the new virtual disk and saving the composition information of the new virtual disk into the composition library otherwise; in addition or in alternative, the step of determining composition information of the old virtual disk comprises retrieving the composition information of the old virtual disk from the composition library.

However, the composition information of the (new and/or old) virtual disks may be determined in any other way (for example, by downloading it from the web sites of the corresponding vendors), even without any composition library.

In an embodiment of the invention, the step of discovering the composition information of the new virtual disk comprises extracting the composition information of the new virtual disk from a descriptor thereof comprised in the new virtual disk.

However, the composition information of the new virtual disk may be discovered in any other way (for example, from End User License Agreements (EULAs) of its software artifacts).

In an embodiment of the invention, the step of enabling or preventing the attachment of the new virtual disk to the selected virtual machine comprises enabling the attachment in response to a fulfillment of the usage entitlements of the new software artifacts following the attachment of the new virtual disk to the selected virtual machine, or preventing the attachment otherwise.

However, different actions may be taken when the usage entitlements of the new software artifacts are not fulfilled; for example, it is possible to enable the attachment of the new virtual disk temporarily (such as for test purposes). Moreover, the corresponding warning message may comprise any additional or different pieces of information (for example, from a simple error code to a suggestion of possible actions to be taken to solve the problem).

In an embodiment of the invention, the step of attaching the new virtual disk to the selected virtual machine comprises activating the new software artifacts by applying an activation module comprised in the new virtual disk.

However, the new software artifacts may be activated in any other way (for example, by launching an installation program thereof); moreover, this result may also be achieved without any activation manager (for example, with an Auto-Run program that is executed automatically after the new virtual disk has been attached to the selected virtual machine). In any case, nothing prevents applying the proposed solution to standard virtual disks (not of the self-activation type).

In an embodiment of the invention, the step of activating the new software artifacts comprises collecting configuration information of the selected virtual machine, and customizing at least one of the new software artifacts according to the configuration information of the selected virtual machine.

However, the configuration information of the selected virtual machine may be on any type (for example, its hostname) and it may be used in any way (for example, for customizing endpoints of other communication channels); in any case, the activation manager may only control the activation of the new software artifacts, whereas their customization is performed manually by the system administrator.

In an embodiment of the invention, each virtual machine has a system virtual disk attached thereto; the system virtual disk comprises a guest operating system of the virtual machine (of any type). The step of activating the new virtual disk comprises copying a de-activation module of the new software artifacts from the new virtual disk to the system virtual disk of the selected virtual machine; the step of detaching the old virtual disk from the further selected virtual machine comprises de-activating the old software artifacts by launching the corresponding de-activation module from the system virtual disk of the further selected virtual machine.

However, the de-activation module may be of any type (for example, a single de-activation script for all the software artifacts of each virtual disk or a distinct de-activation script for each one of them); in any case, nothing prevents de-activating the software artifacts in any other way, even manually by the system administrator.

In an embodiment of the invention, the step of de-activating the old software artifacts comprises deleting the de-activation module of the old software artifacts from the system virtual disk of the further selected virtual machine.

However, this operation is not strictly necessary and it may also be omitted in a basic implementation.

An embodiment of the invention provides a computer program, which comprises code for causing a data-processing system (for example, the above-described data-processing center) to perform the steps of the proposed method when the computer program is executed on the system.

However, the program may be implemented as a stand-alone module, as a plug-in for a provisioning tool, or even directly in the provisioning tool itself. It would be readily apparent that it is also possible to deploy the same solution as a service that is accessed through a network (such as in the Internet). In any case, similar considerations apply if the program is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations; particularly, the program may be in the form of external or resident software, firmware, or micro-code (either in object code or in source code—for example, to be compiled or interpreted). Moreover, it is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are fixed disks (where the program may be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed or otherwise configured.

An embodiment of the invention provides a data-processing system (for example, the above-described data-processing center), which comprises means for performing the steps of the same method.

However, similar considerations apply if the data-processing system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. More specifically, the same method may also be carried out on a data-processing system based on a different architecture (for example, a local, wide area, global, cellular or satellite network), and exploiting any type of (wired and/or wireless) connections; moreover, its implementation on a stand-alone computer is not excluded. In any case, each computer of the data-processing center may have another structure or may comprise similar elements (such as cache memories temporarily storing the programs or parts thereof); moreover, it is possible to replace the computer with any code execution entity, either based on a physical machine or a virtual machine (such as a Personal Digital Assistant (PDA), a mobile phone, and the like), or with a combination of multiple entities (such as a multi-tier architecture, a grid computing infrastructure, and the like).

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling usage of virtual disks in a data-processing center hosting a set of virtual machines, the method comprising:
    loading an image of a new virtual disk into a virtual disk repository in response to detecting a first request of attaching the new virtual disk;
    discovering a set of new software programs comprising at least two software programs in the new virtual disk from the image of the virtual disk in the virtual disk repository;
    adding composition information of the new virtual disk to a composition library, wherein the composition information of the new virtual disk comprises an indication of the set of new software programs;
    enabling the attachment of the new virtual disk to a first selected virtual machine in response to a comparison between the composition information of the new virtual disk and license entitlements of the set of new software programs, indicating that further usage of all software programs in the set of the new software programs is allowed;
    in response to the enabling, attaching the new virtual disk to the first selected virtual machine and activating the set of new software programs;
    automatically, and without manual intervention, updating the license entitlements of the set of new software programs in response to the attachment of the new virtual disk to the first selected virtual machine, wherein updating the license entitlements comprises updating a number of instances of the set of new software programs available for use; and
    preventing the attachment of the new virtual disk to a second selected virtual machine in response to a comparison between the composition information of the new virtual disk and the updated license entitlements of the set of new software programs, wherein the comparison indicates that further usage of at least one of the set of new software programs is not allowed.

2. The method of claim 1, wherein loading the image of the new virtual disk comprises loading the image from a remote source and extracting the composition information from the image of the new virtual disk;
    removing an old virtual disk from the first selected virtual machine,
    wherein removing the old virtual disk comprises:
    deactivating old software programs comprised in the old virtual disk by executing an old de-activation module previously copied to a system virtual disk;
    deleting the old de-activation module of the old virtual disk from the system virtual disk of the first selected virtual machine;
    detecting a removal request of removing the old virtual disk comprising a set of old software programs from the first selected virtual machine;
    detaching the old virtual disk from the first selected virtual machine;
    determining composition information of the old virtual disk, the composition information of the old virtual disk comprising an indication of the set of old software programs; and
    updating license entitlements of the set of old software programs in response to the detachment of the old virtual disk from the first selected virtual machine, wherein updating the license entitlements comprises updating a number of instances of the set of old software programs available for use.

3. The method of claim 2, wherein determining composition information of the old virtual disk comprises retrieving the composition information of the old virtual disk from the composition library, and
    wherein discovering the set of new software programs in the new virtual disk comprises extracting the composition information of the new virtual disk from a descriptor thereof comprised in the new virtual disk.

4. The method of claim 2, further comprising
    activating the set of new software programs by applying an activation module comprised in the new virtual disk.

5. The method of claim 4,
    wherein activating the new virtual disk comprises copying a new de-activation module of the set of new software programs from the new virtual disk to the system virtual disk of the first selected virtual machine.

6. The method of claim 5, the old de-activation module comprises one of:
    a single deactivation script for all software programs in the set of old software programs, and
    a distinct deactivation script for each software program in the set of old software programs.

7. The method of claim 1, wherein loading the image of the new virtual disk comprises loading the image from a website.

8. The method of claim 1, wherein activating the set of new software programs comprises launching an installation program.

9. The method of claim 1, wherein the first request and a second request of attaching the new virtual disk are submitted through a web interface.

10. The method of claim 1, further comprising
activating the set of new software programs by applying an activation module in the new virtual disk, and
wherein the step of activating the set of new software programs comprises:
collecting configuration information of the first selected virtual machine; and
customizing at least one of the set of new software programs according to the configuration information of the first selected virtual machine.

11. The method of claim 10, wherein the configuration information of the first selected virtual machine is an IP address of the first selected virtual machine and the customizing at least one of the set of new software programs according to the configuration information of the first selected virtual machine comprises updating an IP address of a plurality of communication sockets that are embedded in data of the set of new software programs.

12. The method of claim 1, wherein the first selected virtual machine and the second selected virtual machine are hosted on a virtualization layer.

13. The method of claim 12, wherein the attachment of the new virtual disk to the first selected virtual machine is enabled by communicating with the virtualization layer through an application program interface (API).

14. The method of claim 13, wherein the discovering the set of new software programs comprising the at least two software programs further comprises extracting the set of new software programs from an open virtualization format (OVF) descriptor from the image of the virtual disk in response to the virtual disk corresponding to an OVF specification.

15. The method of claim 13, wherein the discovering the set of new software programs comprising the at least two software programs further comprises scanning the image of the virtual disk using the API.

16. The method of claim 13, wherein the activating the set of new software programs further comprises applying the set of new software programs under control of an installation engine of an activation manager.

17. The method of claim 13, wherein the preventing the attachment of the new virtual disk to the second selected virtual machine further comprises sending a warning message that indicates that further usage of the at least one of the set of new software programs is not allowed.

* * * * *